Patented July 18, 1939

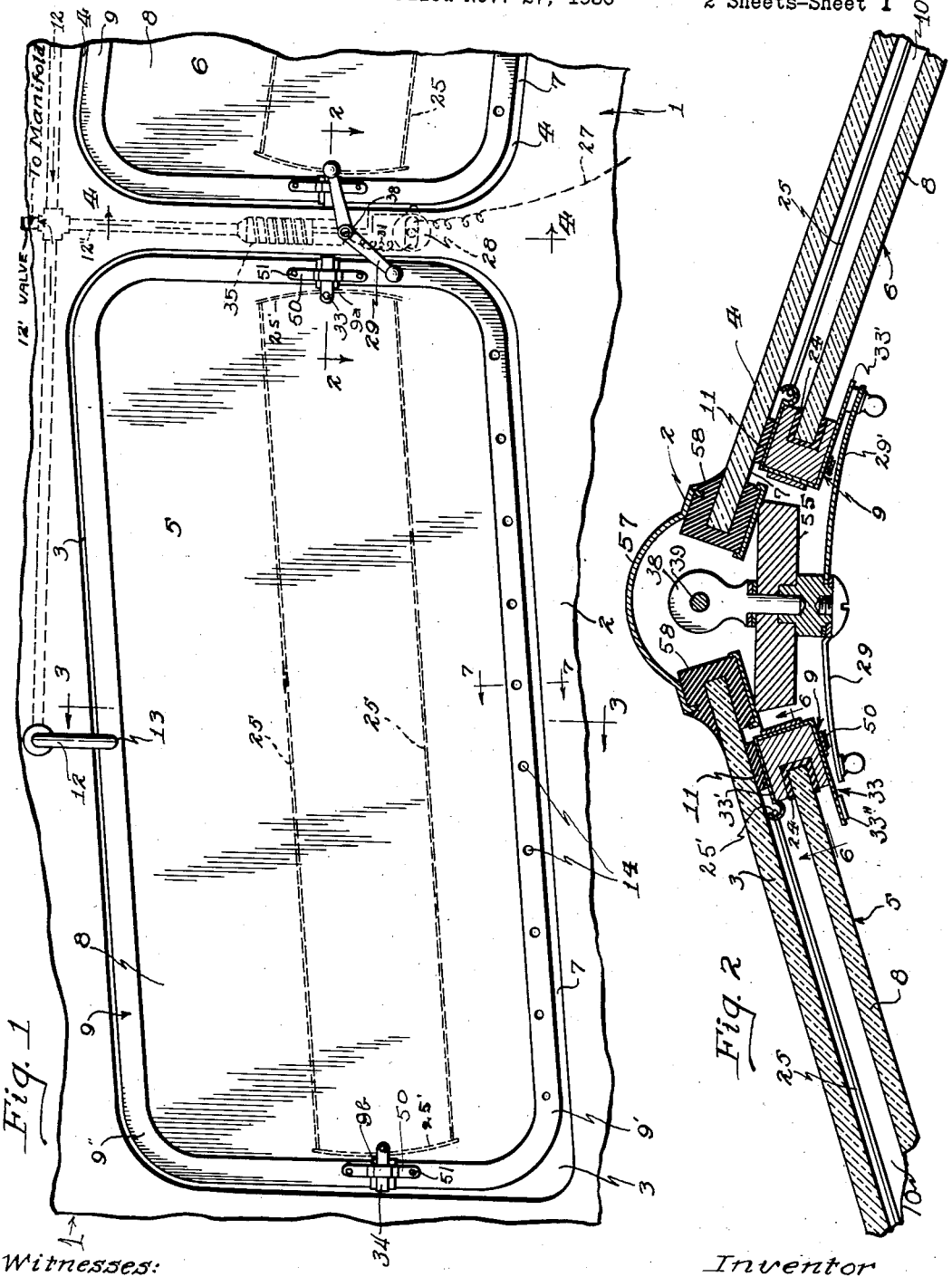

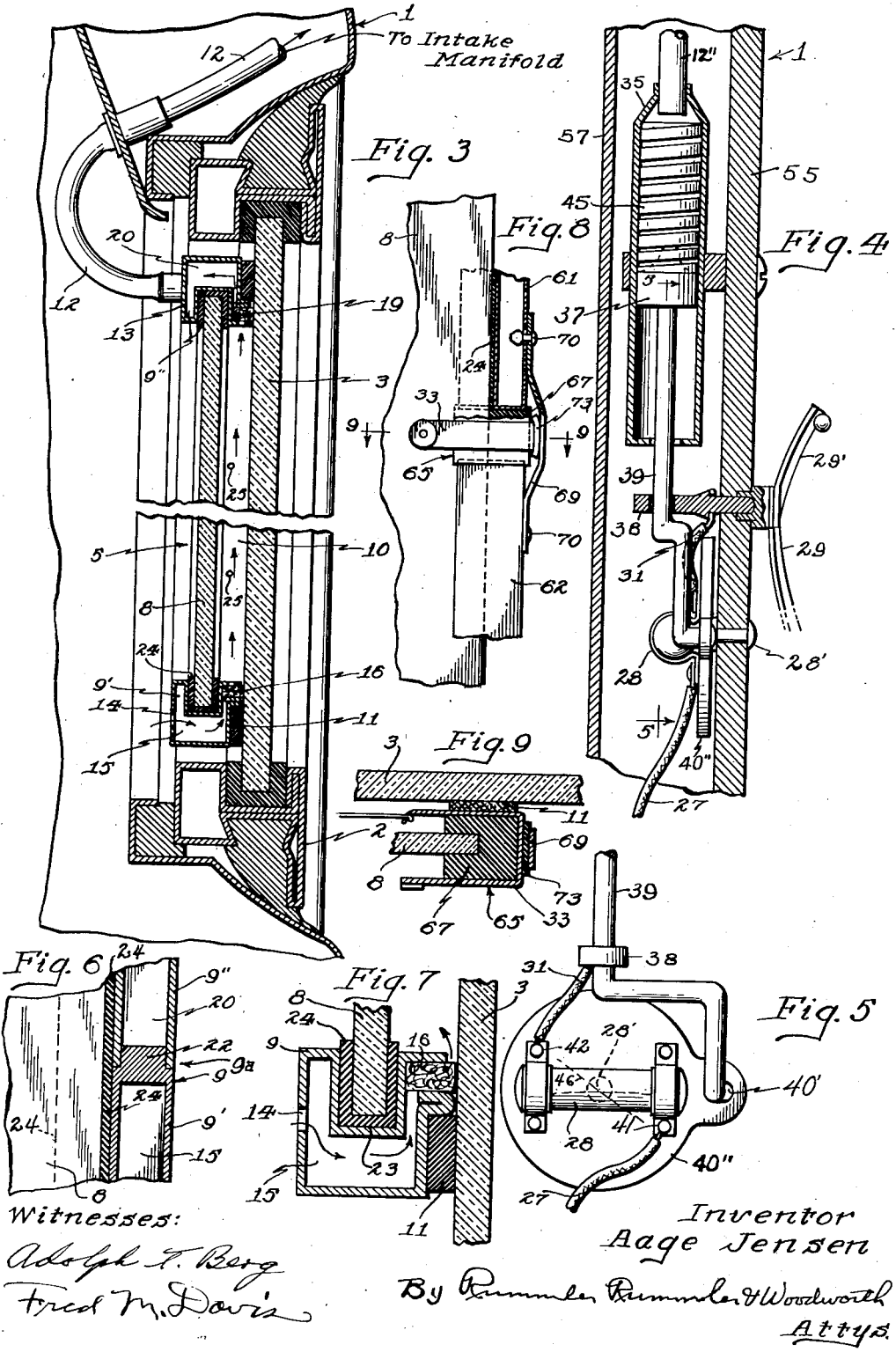

2,166,108

UNITED STATES PATENT OFFICE 2,166,108

WINDSHIELD

Aage Jensen, Phillips, Wis.

Application November 27, 1936, Serial No. 113,031

2 Claims. (Cl. 20—40.5)

This invention relates to windows, windshields and accessories thereto, and especially to such devices adapted for use on automotive vehicles to remove and prevent fog and frost on the windows.

For some ten years past, various attempts have been made for assuring and maintaining better windshield visibility and to supplement or replace the use of fans and manual dashwipers, or to improve thereon.

The current demand for safety and speed, coupled with compactness and a neat appearance, has stressed the importance of better means for assuring and maintaining good visibility at all times, especially for the windshield.

Various ideas have been proposed and tried, including a dead-air space, electric heaters, air conditioners and mechanical means, but these have had such limitations and weaknesses that even now in the colder regions there is observable a tendency, for lack of better and more available means, to revert to the old fan idea for the protection of windshields against frost.

The main objects of the present invention are to provide better means and safeguards against the fogging, icing, and frosting of the glass in such devices in cold or misty weather, and to quickly remove such frost and moisture as at times may occur; and to accomplish this largely or wholly by heat, vacuum and draft means or any of these, energized or controlled by the vehicle motor or engine and adapted to serve either severally or cooperatively. Another object is to keep dust out of the appliance. Further objects are to provide structural features and details adapted to make the methods and means herein described most efficient and useful; and more especially to utilize the pneumatic suction force generated in the intake manifold of the engine to actuate the instrumentalities of the invention.

This invention is accompanied by the following drawings in which:

Fig. 1 is a front elevation of a new-style automobile windshield with the attachment devices of this invention applied thereto, as viewed from inside the vehicle, part of the right side being broken away.

Fig. 2 is an enlarged horizontal section taken substantially on the line 2—2 of Fig. 1, through the middle part of that figure, the ends being broken away.

Fig. 3 is a vertical section on the line 3—3 of Fig. 1.

Fig. 4 is a vertical section taken on the line 4—4 of Fig. 1, to illustrate the pneumatic controller for the heating circuit switch, the plunger being drawn up and the switch being closed.

Fig. 5 is an enlarged front elevation of the tilting mercury switch, of the windshield heater circuit, as shown by dotted lines on Fig. 1 and as viewed in section on line 5—5 in Fig. 4, the mercury switch being closed.

Fig. 6 is a vertical section through the right side of the left windshield frame, taken medially of its height and on the line 6—6 of Fig. 2 in a plane parallel with the windshield pane, facing forward. It shows the horizontal partition separating the upper and lower chambers of the frame.

Fig. 7 is a vertical section on the line 7—7 of Fig. 1 and shows the structure of the protector frame on a large scale.

Fig. 8 is mainly a front elevation of the middle part of the inner end of an attachment such as shown in Fig. 1 but in modified form, the upper part being in section.

Fig. 9 is a sectional diagram on the line 9—9 of Fig. 8.

Referring further to said drawings, only a small part of the front of the automobile 1 is here shown. This comprises a front window frame 2 fitted with a pair of glass panes or windshields 3 and 4, left and right respectively. The equipment here shown is especially adapted for use in some of the more modern cars, though the fundamental ideas of the invention are applicable to all cars having glass windows of any kind.

In order to accomplish my said purposes, I provide for applying to said windshields a pair of moisture controlling attachments 5 and 6 detachably mountable on the inner side thereof, directly on the windshield glass 3. Each of these control elements 5 and 6 follows generally the shape outline of the corresponding window and preferably covers nearly the entire inner face thereof, leaving only a narrow rim 7 uncovered as appears in Fig. 1.

Attachments 5 and 6 being similar in essential characteristics, it will suffice to describe only one of them specifically, as for example element 5.

This control device comprises a glass pane 8 and a sectional tubular frame 9 peripherally embracing the same and serving to hold it in thinly spaced relation to the glass shield 3, said frame 9 bearing against shield 3 and said pane 8 and frame 9 combining with shield 3 to form a thin closed chamber 10. This chamber may well be about a quarter of an inch or less in thickness. Said frame 9 is secured to glass 3 by a strip of elastic adhesive 11 which serves also as a resilient cushion.

In order to minimize, prevent and remove windshield fog and frost I attemperate the air in space 10, and for this purpose I rely upon rarefying and heating the air therein simultaneously with gradual change of air in said chamber. Although merely rarefying the air tends to avoid and largely does prevent condensation of moisture, still in freezing weather I find it desirable to add heat, especially whenever snow and ice tends to collect on the outside.

Rarefication

In order to produce a partial vacuum in the chamber 10, and in order that it may be generated automatically, I provide a suction tube 12 connected at one end to the dash window frame 2 and communicating at 13 with the interior of frame 9 and thence with space 10. The other end of said tube is connected to the intake manifold of the vehicle engine or motor, not shown, and communicates with the interior thereof, as will be understood, whereby operation of the engine tends to produce a vacuum in said space 10. This air suction feature may be controlled by a valve 12' in the tube 12 leading to the engine.

In order that there may be a gradual flow or seepage of air into and through the space 10, and in order that this flow may be distributed generally across the entire breadth thereof I provide special structural features for the hollow frame 9. The U-shaped lower part or half 9' of said frame is provided with a series of air inlet holes 14 and the inverted U-shaped upper part or half 9'' communicates directly with said suction tube 12. The frame joints 9a and 9b further referred to and described are shown on Figs. 1 and 6.

In order that the admission of air may be substantially uniform along the lower edge of the chamber 10, the air is caused to pass from the space 15 of frame part 9' into said chamber 10 through a fibrous packing 16, as for instance a strip of felt or the like, which strip 16 serves also as a strainer to prevent entry of dust to the chamber 10.

Similarly, in order to assure uniform distribution of the outlet movement of air from the top of space 10, the air is caused to exit through a similar strip of felt 19, or the like, into the chamber 20 of frame part 9'', from whence it is drawn through the said suction pipe 12 to the engine manifold. The tubular chambers or spaces 15 and 20 are separated by blocks or walls 22 at the sides, substantially as shown by Fig. 6.

The frame 9 as a whole on its inner edge is formed with a groove 23 to receive the edge of pane 8 with a cushioning and sealing strip or layer 24 of rubber or the like.

Heating

In order to supplement the clarifying effect of attenuating the air in chamber 10, and especially to remove external ice and snow, I also provide heating means therein. For this purpose I mount a pair of electrical resistance heater wires or elements 25 one above the other in parallel relation and conduct current therethrough, subject to automatic and manual control as will be described. The said wires 25 are stretched between the tensioned bow springs 25' held on the inner ends of certain terminals, to be described.

Electric current from any available source, as for instance six bolt direct current from the automobile storage battery, not shown, is brought through a conductor 27 to a mercury switch 28 and thence to a manual control switch 29 contained in the circuit leading by way of wire 31 to the terminal 33 and bows 25' for the inner end of the said heating element 25. The outer end of the heating element, that is to say the left end as viewed in Fig. 1 is connected as at 34 to means communicating with the other side of the battery,—for which purpose this left end of the heater, through terminal 34, may be grounded on the frame 9 and the frame of the car, by way of tube 12, or otherwise connected for similar effect as may be preferred.

The terminal 33 is a U-strip one arm 33' of which extends into chamber 10 to receive wire 25, and the arm 33'' being exposed to receive the contact point of switch 29.

In order that the switch 28 may be responsive to the engine, and especially the vacuum in the intake manifold thereof, the suction pipe has a branch 12'' leading downward to an upwardly closed piston cylinder 35 having a pneumatic plunger 37 therein, which plunger connects downwardly, through an apertured guide post 38, by means of a rod or arm 39 leading to one end of the centrally pivoted mounting plate 40 for said switch 28, the pivot for which plate is indicated at 28'. This switch has two terminals 41 and 42 connected to the electric circuit wires 27 and 31 respectively which terminals are so positioned on the casing of said switch 28 that when the said plunger 37 is drawn upward by suction and the switch 28 is rotated counter-clockwise on Fig. 5 to bring said terminals into a horizontal alignment where they are connected by the mercury in said switch. The pivot hold 40' on plate 40 is horizontally oblong to accommodate due mechanical operation of rod 39.

When the vacuum ceases, as by stopping of the engine, or closing valve 12', the plunger 39 is restored downwardly by a compression spring 45 in the upper end of cylinder 35 and a switch 28 rotated oppositely to a position indicated by line 46 on Fig. 5, so that the contacts 41 and 42 are out of horizontal alignment and one of them, namely 42, is thrown above the surface level of the mercury, whereby the heater circuit as a whole is broken. The switch 28 may be released for self opening also by turning a cutoff valve, not shown, in the suction tube 12'' leading to the engine, as will be understood.

The right and left joints 9a and 9b for the frame 9 may be formed in various ways, the essential provisions being first, ready assemblage so as to embrace the pane 8 edgewise; and second, separation of the upper chamber 9'' from the lower chamber 9'.

In order to positively hold the frame members 9' and 9'' together at said joints a splice plate 50 is laid over the joint and is spot welded at its ends to the corresponding frame ends, as shown at 51 on Fig. 1. This plate 50 also overlies the terminal strips 33 and 34 crosswise and secures them in place, strip 33 being insulated.

Referring now to Figs. 2 and 4, the middle upright frame part, separating panes 3 and 4 and housing the suction switch control means 35, 37 etc., comprises a panel 55 on which the control apparatus is mounted and a shield 57 secured to the windshield frame bars 56.

It is to be understood that the size of the attachment 5 may vary according to the size and shape of the pane to be protected, and that if the front windshield be not divided, then the device 5 may extend clear across the front of the car, as will be obvious.

Referring now to Figs. 8 and 9, the specific form here shown comprises an upper frame part 61 and a lower frame part 62 corresponding substantially in shape and function with the parts 9' and 9" above referred to; but somewhat distinctly the joint 65 here shown is made by placing the adjacent frame ends nearly end to end with a block of rubber 67 interposed. The parts 61 and 62 are held together releasably and snugly against the block 67 by means of spring connection 69 having snap fasteners 70 on its ends to fit in the holes 71 of the frame.

Here the electric heater terminal yoke 33 embraces said block 67 and is insulated from the frame connector 69 by the plate 73. Said block 67 is grooved to receive the edge of the glass plate 8. The inner arm of terminal 33 lies between block 67 and the peripheral sealing strip 11.

In case it be desired to equip all of the windows of a car with such attachments as herein described and it should be found in any instance that the engine be overtaxed, I contemplate substituting any other convenient source of vacuum pull. In the case of motor busses for instance, it may be deemed preferable to install special air pumps or fans to operate the defrosters.

In my claims appended to this specification, the word "windshield" is to be taken generically and with a somewhat extended meaning rather than in a strict or narrow technical sense, so as to cover all transparent wind and weather shielding means generally including the various and several windows of a vehicle, front, side and rear.

It is to be understood that some of the details set forth may be altered or omitted without departing from the spirit of the invention as defined by the following claims.

I claim:

1. A device of the class described comprising an automobile windshield in combination with an attachment adapted to provide for conditioning of the air adjacent to the inner side of the windshield, said attachment including a pane of glass spaced inwardly from and parallel with the windshield to provide an air space, and a peripheral tubular chamber surrounding said space, the upper part of said chamber being separate from the lower part, means to gradually exhaust the air from the upper part and means to admit air to the lower part, said peripheral chamber as a whole being separated from said air space by felt-like means adapted to permit gradual seepage of air therethrough.

2. An automobile windshield in combination with air-pocket forming means attachable to the inner side of the windshield, said means comprising a tubular frame containing a panel of glass held by said frame in spaced relation to the windshield with an air space therebetween, the lower part of the chamber in said frame being air sealed from the upper part, the lower part being adapted to admit air from the interior of the car and having filtering means on one edge adapted to admit air gradually therefrom into the space between the windshield and the attachment plate, and the upper part of the frame chamber having means to permit gradual seepage of air from said space into said chamber, and suction means connected to the upper part of said chamber to gradually remove air therefrom.

AAGE JENSEN.